United States Patent
Rodriguez Bravo

(10) Patent No.: US 10,755,533 B2
(45) Date of Patent: Aug. 25, 2020

(54) SECURE ANTI-SKIMMER TECHNOLOGY FOR USE WITH MAGNETIC CARDS

(71) Applicant: INTERNATIONAL BUSINESS MACHINES CORPORATION, Armonk, NY (US)

(72) Inventor: Cesar Augusto Rodriguez Bravo, Alajuela (CR)

(73) Assignee: International Business Machines Corporation, Armonk, NY (US)

(*) Notice: Subject to any disclaimer, the term of this patent is extended or adjusted under 35 U.S.C. 154(b) by 244 days.

(21) Appl. No.: 15/968,859

(22) Filed: May 2, 2018

(65) Prior Publication Data

US 2019/0340892 A1 Nov. 7, 2019

(51) Int. Cl.
| | | |
|---|---|---|
| *G07F 19/00* | (2006.01) | |
| *G06K 7/08* | (2006.01) | |
| *G06K 7/10* | (2006.01) | |
| *G06K 19/077* | (2006.01) | |
| *G07F 7/08* | (2006.01) | |
| *G06K 7/00* | (2006.01) | |
| *G06K 19/07* | (2006.01) | |
| *G06K 19/073* | (2006.01) | |

(52) U.S. Cl.
CPC ....... *G07F 19/2055* (2013.01); *G06K 7/0069* (2013.01); *G06K 7/087* (2013.01); *G06K 7/10257* (2013.01); *G06K 19/07* (2013.01); *G06K 19/07372* (2013.01); *G06K 19/07769* (2013.01); *G07F 7/0813* (2013.01)

(58) Field of Classification Search
CPC .... G07F 7/0806; G07F 7/1008; G07F 7/0813; G07F 19/2055; G06K 7/0069; G06K 7/10257; G06K 19/07372; G06K 19/07; G06K 19/07769
See application file for complete search history.

(56) References Cited

U.S. PATENT DOCUMENTS 3,802,101 A * 4/1974 Scantlin ................ G06K 1/126
283/87
4,798,942 A * 1/1989 Aubrey ................ G06K 13/063
235/384

(Continued)

OTHER PUBLICATIONS

NCR, "NCR Introduces Anti-Skimming Technology to Help Banks Increase Consumer Trust and Reduce Costs", https://www.ncr.com/news/newsroom/news-releases/financial/ncr-introd . . . , printed Feb. 14, 2018, pp. 1-4.

(Continued)

*Primary Examiner* — Daniel I Walsh
(74) *Attorney, Agent, or Firm* — L. Jeffrey Kelly

(57) ABSTRACT

Detecting and reporting skimming of a magnetic stripe of a magnetic instrument having a magnetic stripe. The magnetic head detector detects a reading of the magnetic stripe from the magnetic instrument and, if the reading is detected, transmits a reporting signal to a microchip indicating the magnetic stripe was read. The microchip receives the reporting signal from the magnetic head detector and transmits a buzzer signal to a microbuzzer. The microbuzzer generates an audible notification when the buzzer signal is received from the microchip. A microbattery powers the magnetic head detector, the microchip, and the microbuzzer.

8 Claims, 4 Drawing Sheets

(56) References Cited

U.S. PATENT DOCUMENTS

| | | | |
|---|---|---|---|
| 6,196,460 B1* | 3/2001 | Shin | G07F 7/08 235/380 |
| 6,342,037 B1* | 1/2002 | Roe | A61F 13/42 422/1 |
| 6,679,425 B1* | 1/2004 | Sheppard | G06Q 20/342 235/375 |
| 2002/0133462 A1* | 9/2002 | Shteyn | G06Q 20/10 705/44 |
| 2003/0071730 A1* | 4/2003 | Valbh | G07B 15/00 340/572.1 |
| 2004/0026506 A1* | 2/2004 | Finkelstein | G06K 19/06187 235/449 |
| 2004/0236302 A1* | 11/2004 | Wilhelm | A61F 13/42 604/389 |
| 2005/0045375 A1* | 3/2005 | Carlson | H01L 51/0021 174/255 |
| 2005/0097261 A1* | 5/2005 | Jung | G06Q 20/347 711/100 |
| 2005/0199714 A1* | 9/2005 | Brandt | G06Q 20/40 235/382.5 |
| 2006/0027665 A1* | 2/2006 | Divine | G06K 19/07 235/492 |
| 2006/0213986 A1* | 9/2006 | Register, Jr. | G06K 19/0719 235/382.5 |
| 2006/0249574 A1* | 11/2006 | Brown | G06K 19/06187 235/380 |
| 2006/0289657 A1* | 12/2006 | Rosenberg | G06K 19/07345 235/492 |
| 2007/0040019 A1* | 2/2007 | Berghel | G06K 7/08 235/380 |
| 2007/0169193 A1* | 7/2007 | Ikehara | G07C 9/00103 726/23 |
| 2008/0117452 A1* | 5/2008 | Murakami | G06F 21/608 358/1.15 |
| 2008/0201264 A1* | 8/2008 | Brown | G06Q 20/3674 705/67 |
| 2008/0275327 A1* | 11/2008 | Faarbaek | A61B 5/0002 600/382 |
| 2008/0308641 A1 | 12/2008 | Finn | |
| 2009/0159663 A1* | 6/2009 | Mullen | G06K 7/10297 235/379 |
| 2009/0245029 A1* | 10/2009 | Kam | G06K 19/07 368/10 |
| 2011/0174874 A1* | 7/2011 | Poznansky | G06K 19/12 235/379 |
| 2011/0189528 A1* | 8/2011 | Wu | H01M 2/0207 429/127 |
| 2011/0263384 A1* | 10/2011 | Drazan | A63B 21/0053 482/2 |
| 2012/0002313 A1* | 1/2012 | Miyabe | G06K 7/084 360/2 |
| 2012/0280041 A1* | 11/2012 | Ross | G07F 19/2055 235/439 |
| 2012/0318871 A1 | 12/2012 | Mullen et al. | |
| 2013/0228628 A1* | 9/2013 | Bona | G06K 19/06 235/488 |
| 2013/0299582 A1* | 11/2013 | Ozawa | G06K 7/0091 235/440 |
| 2013/0299585 A1* | 11/2013 | Yokomoto | G06K 7/084 235/449 |
| 2014/0015822 A1* | 1/2014 | Hu | H02J 7/0055 345/212 |
| 2014/0118134 A1* | 5/2014 | Won | B60C 23/0413 340/442 |
| 2014/0158768 A1* | 6/2014 | Ray | H04K 3/825 235/449 |
| 2015/0242662 A1* | 8/2015 | Claessen | G06K 7/10267 340/658 |
| 2016/0142174 A1* | 5/2016 | Fine | H04K 3/86 455/1 |
| 2016/0260100 A1* | 9/2016 | Wiesman | G06Q 20/405 |
| 2016/0335642 A1* | 11/2016 | Sogawa | G06Q 20/34 |
| 2016/0358059 A1* | 12/2016 | Chatterton | G06F 21/77 |
| 2017/0018135 A1* | 1/2017 | Sakamaki | G07F 19/2055 |
| 2017/0140144 A1* | 5/2017 | Bock | G06K 9/00979 |
| 2017/0170676 A1* | 6/2017 | Cheah | H02J 50/10 |
| 2017/0236357 A1* | 8/2017 | Kessler | G07F 7/0886 705/39 |
| 2018/0039987 A1* | 2/2018 | Molino | G06Q 20/4012 |
| 2018/0060578 A1* | 3/2018 | Kim | G07F 19/2055 |
| 2019/0340892 A1* | 11/2019 | Rodriguez Bravo | G06K 19/07309 |

OTHER PUBLICATIONS http://www.atmatom.com/why-emv-compliant-atms-need-anti-skimm . . . , "Why EMV-compliant ATMS Need Anti-Skimming Technology", printed Feb. 14, 2018, pp. 1-2.
FBI, Taking a Trip to the ATM?, Beware of "Skimmers", http://www.fbi.gov/news/stories/atm-skimming, Jul. 14, 2011, pp. 1-5.
ASE5, "ASM—Anti-Skimming Eye", http://www.antiskimmingeye.com/ase5.html, printed Feb. 14, 2018, pp. 1-4.
Diebold Nixdorf Software, "Operations & Management Solutions", 2016, pp. 1-2.
Techtheday, "ActivEdge Card Reader: Is This the Solution to the Card Skimming Problem?", http://techtheday.com/activedge-card-reader-is-this-the-solution-to-the-ca . . . , printed Feb. 14, 2018, pp. 1-7.
TMD Security, "TMD Security Pack 4: Anti-Skimming with Skimming Device Detection plus Anti-Card Trapping", http://www.atmmarketplace.com/companies/showcases/tmd-security, printed Feb. 14, 2018, pp. 1-9.
Krebs on Security, In-depth security news and investigation, "Crooks Go Deep With 'Deep Insert' Skimmers", https://krebsonsecurity.com/2016/05/crooks-go-deep-with-deep-insert-s . . . , May 16, 2005, pp. 1-1.
https://atmpart.en.alibaba.com/product/539312617-213211145/ATM_par . . . , "ATM Parts We Sell All Kinds of Anti-Skimmer/Fraud Device (larger number in stock)", printed Feb. 14, 2018, pp. 1-3.
You Tube, "Skimmer for anti-skimmer Wincor", https://www.youtube.com/watch?v=T6iXdp3fYFg, printed Feb. 16, 2018, pp. 1-2.

* cited by examiner

SECURE ANTI-SKIMMER TECHNOLOGY FOR USE WITH MAGNETIC CARDS

BACKGROUND

The present invention relates generally to the field of fraud prevention, and more particularly to anti-skimming technology for use with magnetic instruments.

BRIEF SUMMARY

Embodiments of the present invention disclose a system, method, and computer program product for detecting and reporting skimming of a magnetic stripe of a magnetic instrument. The magnetic instrument may, in various embodiments of the invention, have a magnetic stripe or other magnetic means of storing account information in connection with the magnetic instrument. A magnetic head detector detects a reading of the magnetic stripe from the magnetic instrument, and, if the reading is detected, transmits a reporting signal to a microchip indicating the magnetic stripe from the magnetic instrument was read. The microchip receives the reporting signal from the magnetic head detector and, upon receipt of the reporting signal, transmits a buzzer signal to a microbuzzer. The microbuzzer generates an audible notification when the buzzer signal is received from the microchip. A microbattery powers the magnetic head detector, the microchip, and/or the microbuzzer.

DETAILED DESCRIPTION

Credit cards, debit cards, and similar instruments utilizing magnetic stripes to encode accountholder information for utilization in completion of cashless transactions (collectively, "magnetic instruments") are vulnerable to fraud as a new generation of tech-savvy scammers develops ways to obtain, and later mimic the encoded accountholder information contained in the magnetic instruments. As disclosed in the context of the presently disclosed invention, "magnetic instruments" may also refer to all applications utilizing magnetic stripes such as instruments with magnetic stripes utilized for accessing a location, cards utilizing magnetic stripes for access to amusement park rides and arcade games, cards with magnetic stripes for maintaining a reward point balance (such as at a car wash), etc.

A common scheme utilized to obtain the encoded accountholder information in the magnetic stripes of magnetic instruments is with the use of so-called "skimmers" hidden in ATMs, gas pumps, or other point-of-sale devices at point-of-sale locations. Alternatively, the skimmers may be located anywhere magnetic instruments are utilized to access a location (such as on a swipe card entry system operating a lock), access reward balance kiosks, etc. The skimmers are designed to read and record accountholder information contained in the magnetic stripe for later, fraudulent use. Presented is a system, method, and computer program product for detecting and reporting skimming of a magnetic stripe of a magnetic instrument.

Figure 1:
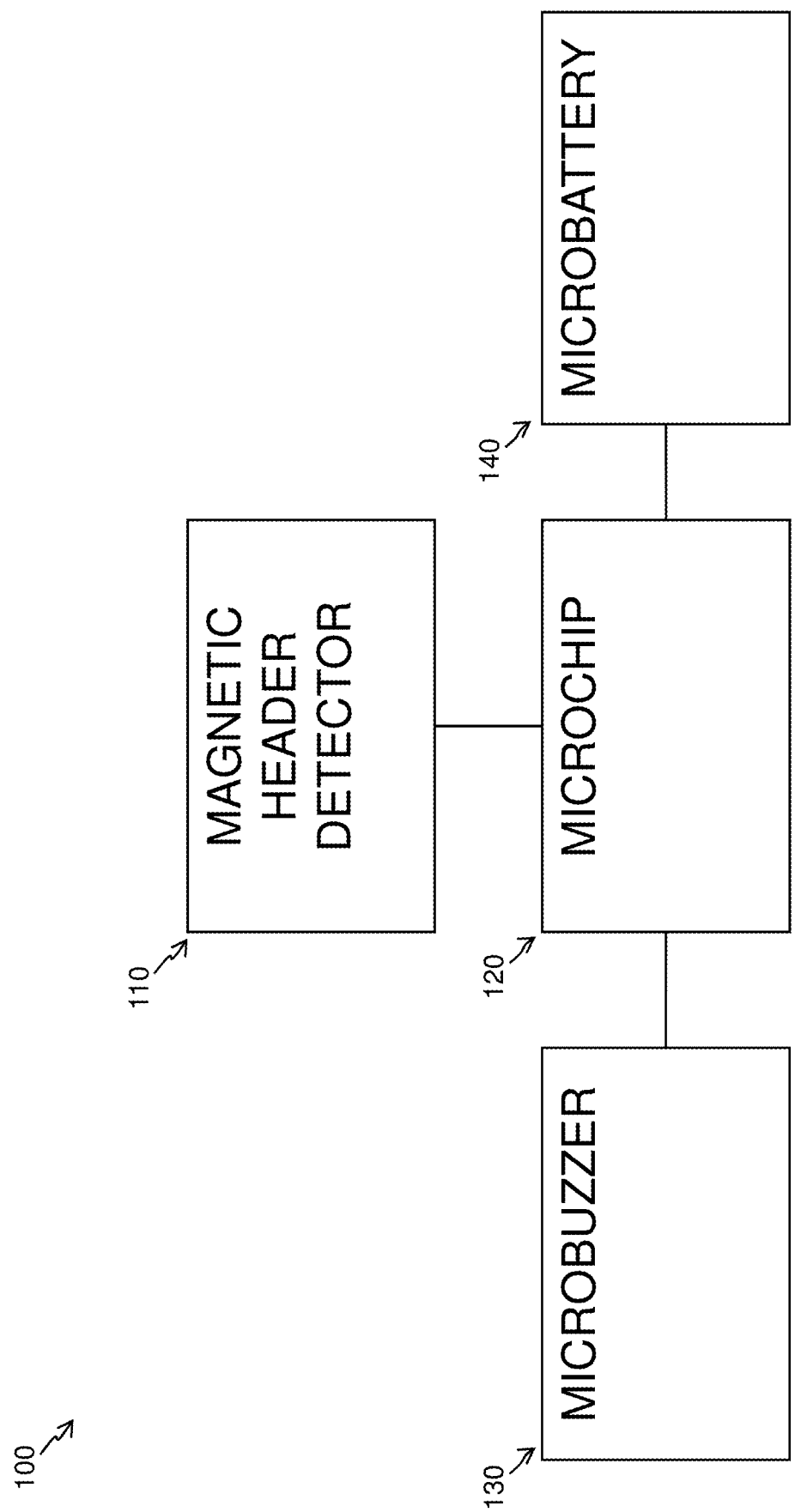
FIG. 1 is a functional block diagram illustrating a system for detecting and reporting skimming of a magnetic instrument, in accordance with an embodiment of the present invention.

FIG. 1 is a functional block diagram illustrating a magnetic instrument 100 and an exemplary embodiment of the presently disclosed invention for detecting and reporting skimming of a magnetic stripe of a magnetic instrument. The magnetic instrument 100 has a magnetic stripe, which stores account information in connection with the magnetic instrument (or other magnetic means of storing information), and is read by various devices, including a point-of-sale device, to an access reward balance kiosk, etc. In the context of the invention, benefits in fraud prevention are provided immediately, by allowing a magnetic instrument holder to recognize potential loss of account information (as discussed further below). Even if a scammer is able to obtain several account numbers without the knowledge of any magnetic instrument holder, the invention may dissuade future scammers from placing skimmers on a point-of-sale device at all, by knowledge that such a device exists. In the exemplary embodiment, included in the magnetic instrument 100 are a magnetic head detector 110, a microchip 120, a microbuzzer 130, and a microbattery 140. In the course of attempting to obtain cash, pay for gasoline, buy something from a vending machine, etc., a magnetic instrument holder inserts or swipes a magnetic instrument 100 in a point-of-sale device (or, alternatively, attempts to enter a location, access a rewards account, etc.). In the context of the invention, a skimmer previously placed by a scammer on the point-of-sale device skims the magnetic instrument 100 with a magnetic reading head before it is fully inserted into the point-of-sale device (or while it is being inserted, etc.), and records the accountholder information recorded on the magnetic stripe. If the magnetic head detector 110 detects reading of the magnetic stripe from the magnetic instrument 100, such as by detecting a magnetic field or alternative means, as is further discussed below, an audible notification is generated by the microbuzzer 130, which a user utilizing the magnetic instrument 100 can hear. In circumstances where a scammer has placed a skimmer on the point-of-sale device or another device accepting the magnetic instrument 100, a second read of the accountholder information recorded on the magnetic stripe occurs, and when the magnetic head detector 110 detects this, the microbuzzer 130 issues a second (or further) audible notification. The user of the magnetic instrument 100 is thus alerted to potential fraud which may take place. In various embodiments of the invention, whether the magnetic instrument 100 is swiped at a location and thereby read, or inserted and read internally, various number of audible notifications may be heard, and these are contemplated herein. For example, in embodiments where the magnetic instrument 100 is swiped in only one direction, only a single audible notification may be generated in normal course while, in embodiments, where the magnetic instrument 100 is inserted in one direction and subsequently removed in the reverse direction, two audible notifications may be generated in normal course.

In the example embodiment, magnetic head detector 110 is an electronic component or component which serves to detect a magnetic signal/field from a magnetic reader head from point-of-sale devices (or other devices to read magnetic instrument 100) as a magnetic stripe is read from a magnetic instrument 100, and/or a detect magnetic signal/ field from magnetic reader heads in skimmers reading the magnetic stripe from the magnetic instrument 100. In the various embodiments, when the magnetic head detector 110 detects the magnetic signals or fields as discussed, the magnetic head detector 110 transmits a reporting signal to microchip 120, as further discussed below. In various embodiments of the invention, the magnetic head detector 110 does not distinguish whether the magnetic signal originated from a point-of-sale device, other device, or skimmer(s), and the magnetic head detector 110 transmits a reporting signal for each magnetic reader head or magnetic signal detected from every skimmer and/or point-of-sale device. The one or more reporting signals as they are received are transmitted to the microchip 120 for further utilization and processing, as further discussed herein.

Microchip 120 is an electronic component or components (such as a microprocessor) for controlling various components of the presently disclosed invention as further discussed herein. Microchip 120 receives each reporting signal generated by the magnetic head detector 110 and, upon receipt of each reporting signal, transmits a buzzer signal to microbuzzer 130 to create an audible notification, e.g., a buzz. The microchip 120 may also, in an embodiment of the invention, serves to regulate and provide electrical power received from microbattery 140 to power magnetic head detector 110 and/or microbuzzer 130. In various embodiments of the invention, the microchip 120 may utilize one or more of wi-fi, Bluetooth®, radio, cellular, near field communication, or another means of wirelessly communicating data to automatically notify a financial institution supporting the magnetic instrument 100 or the proper authorities of the plurality of reporting signals received within a predefined timeframe (such as two within a one second interval, a two second interval, a three second interval, or a five second interval), indicating a skimmer may exist in a point-of-sale device or other device. Note that the predefined timeframe may be dependent on the nature of the swipe or insertion of the magnetic instrument 100. For example, in embodiments where the magnetic instrument 100 is inserted in one direction and subsequently removed in the opposite direction, it may be appropriate to hear two audible notifications and, therefore, the microchip 120 may be configured to disregard such false positives in alerting authoritative bodies.

Microbuzzer 130 represents a small, electronic buzzer for generating an audible notification when the buzzer signal is received from the microchip 120. The audible notification, in effect, allows a user when inserting or swiping the magnetic instrument 100 in a point-of-sale device or other device to hear a sound each time an attempt is made to read the magnetic stripe of magnetic instrument 100 is detected by the magnetic head detector 110. For example, in cases where a skimmer is covertly placed on a point-of-sale device, if a user hears more than two audible sounds when magnetic instrument 100 is swiped at the point-of-sale device or other device, this serves to notify the user that the magnetic stripe has been read more than once, such as by a skimmer (indicated by the first audible notification) before reading by the point-of-sale device or other device where the user intended to utilize the magnetic instrument 100 (indicated by the second audible notification). Once the user has been put on alert by the microbuzzer 130 generating more than one audible signal, the user may take precautions against unauthorized use of his or her magnetic instrument 100, such as by contacting the company providing the magnetic instrument to watch for unexpected charges, independently watching his or her own financial statement, deactivating the magnetic instrument 100, notifying the proper authorities regarding the point-of-sale device, etc., or other action as described further herein.

Microbattery 140 represents a small device to provide electrical power to one or more of the magnetic head detector 110, the microchip 120, and the microbuzzer 130. The microbattery 140 may be a lithium ion battery, a lithium-polymer battery, or any other type of battery performing the various functions as discussed herein. In various embodiments of the invention, microbattery 140 provides 1.0 volts, 1.35 volts, 1.5 volts, 2.0 volts, and 3.0 volts. The microbattery 140 may be any type of appropriate battery presently existing or after-arising. In embodiments where the microbattery 140 is located within the magnetic instrument 100, the microbattery 140 may be printed directly onto the magnetic instrument 100, such as by a thin-film lithium ion battery printed on the magnetic instrument 100. A solar panel located on the magnetic instrument 100 may be utilized to recharge the microbattery 140.

Figure 2:
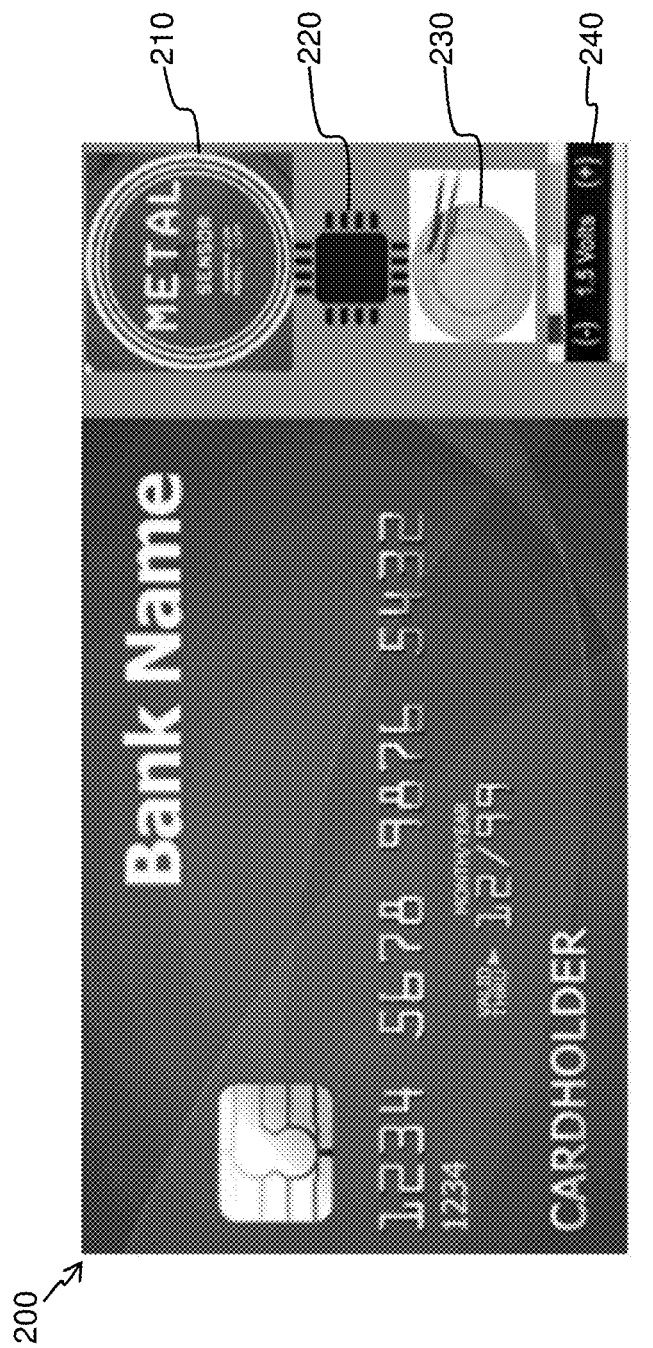
FIG. 2 is a diagram of a magnetic instruments containing a magnetic head detector, a microchip, a microbuzzer, and a microbattery, in accordance with an embodiment of the present invention

FIG. 2 is a representation of a magnetic instrument 200 containing an embodiment of the invention. In this embodiment, the components of the presently disclosed invention are built into the magnetic instrument 200, with a magnetic head detector 210 built into the magnetic instrument 200, a microprocessor 220 providing necessary logic embedded in the magnetic instrument 200, a microbuzzer 230 providing the audible notifications to the user embedded or on the exterior of the magnetic instrument 200, and a microbattery 240 powering the magnetic head detector 210, the microprocessor 220, and the microbuzzer 230 also embedded or on the exterior of the magnetic instrument 200. In alternative embodiments of the invention, the magnetic head detector 210, microprocessor 220, microbuzzer 230, and microbattery 240 are embedded in a card having the same width and height as magnetic instrument 200, and can be attached to one side of the magnetic instrument 200 when it is inserted into a point-of-sale device. Though not illustrated in FIG. 2, the magnetic instrument 200 of the example embodiment further comprises a magnetic stripe detailing user information.

Figure 3A:
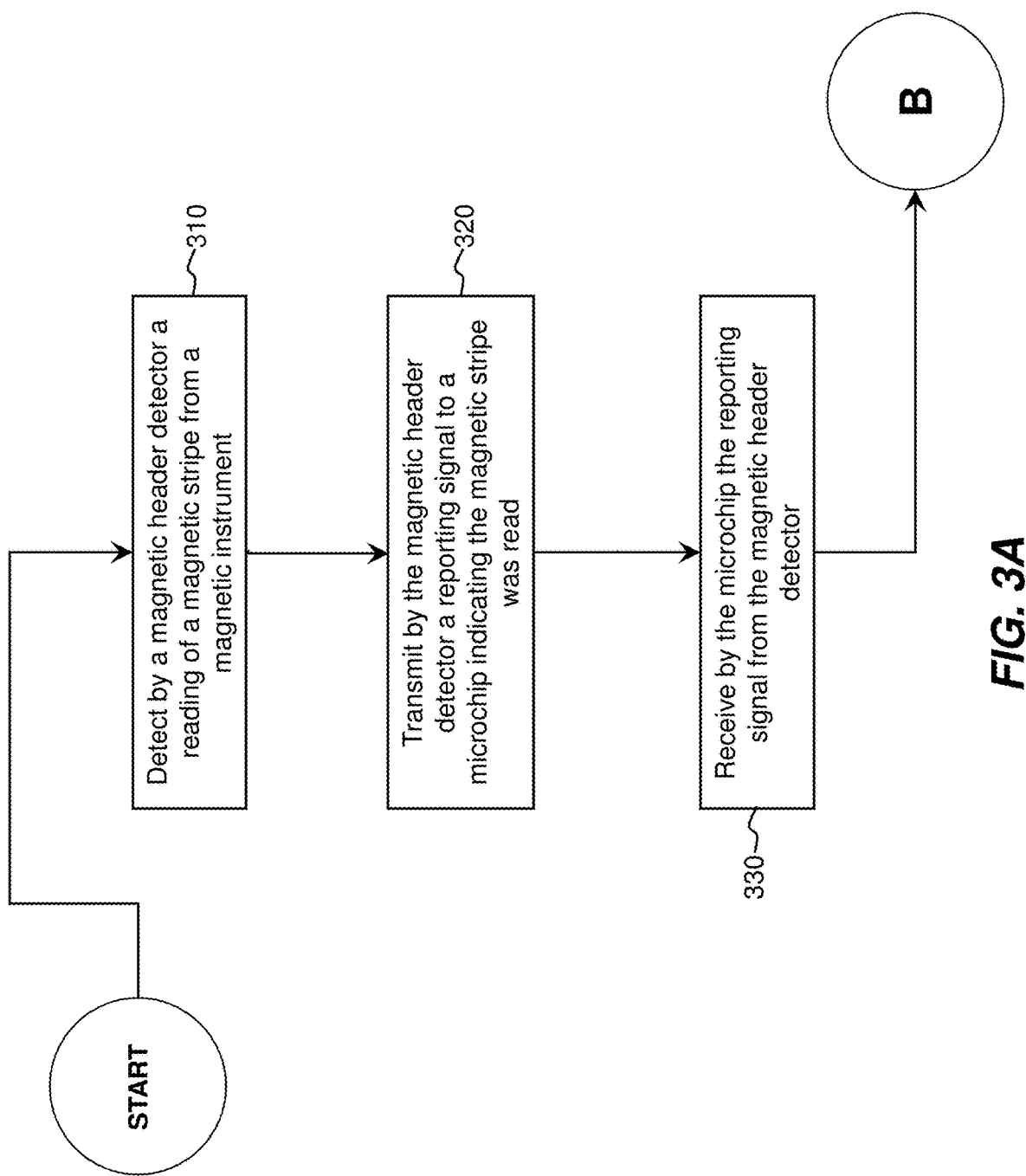
FIGS. 3A and 3B are a flowchart depicting operational steps that a hardware component of a hardware appliance may execute, in accordance with an embodiment of the invention.
Figure 3B:
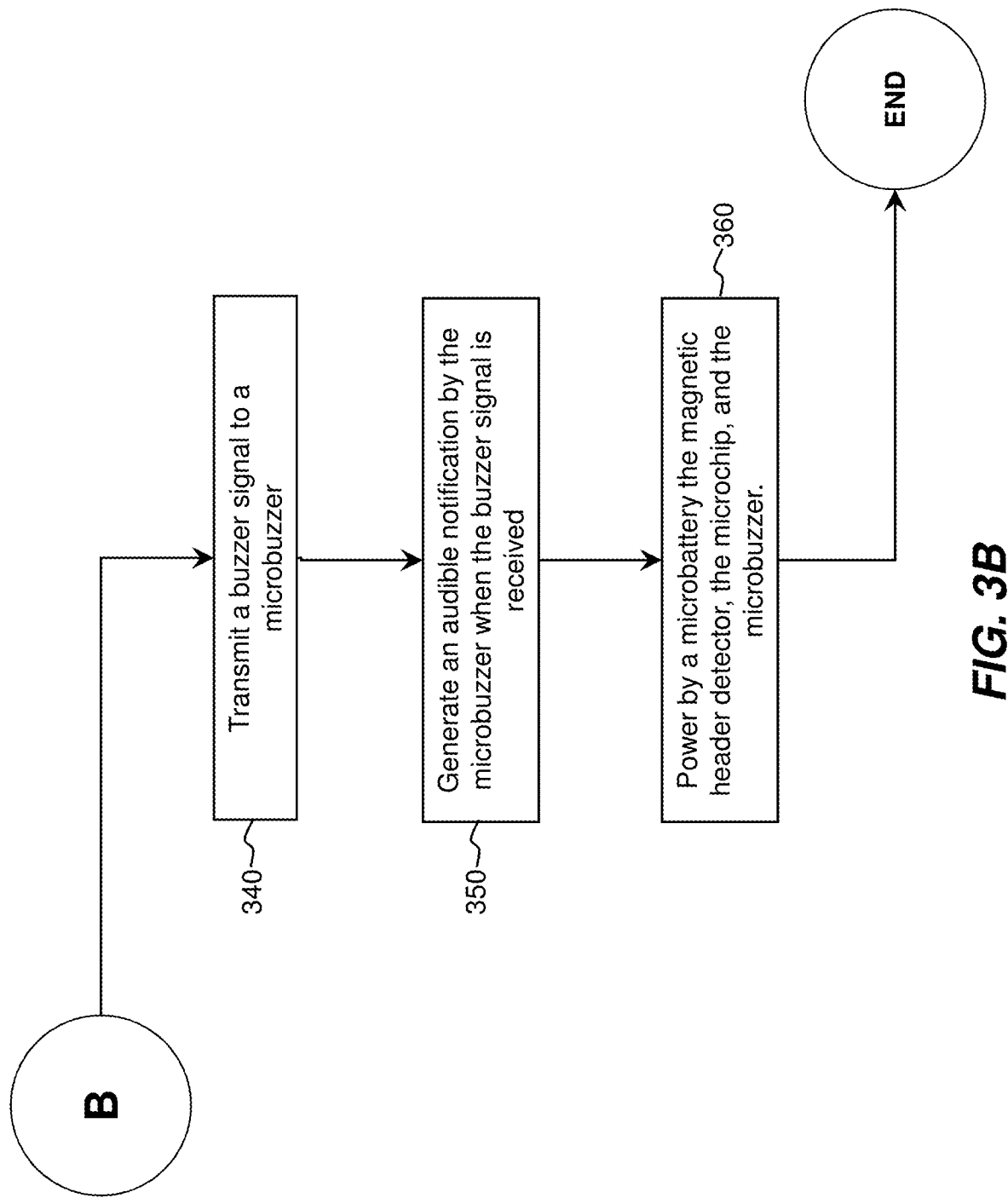

FIGS. 3A and 3B are a flowchart depicting operational steps that a hardware component, multiple hardware components, and/or a hardware appliance may execute, in accordance with an embodiment of the invention. At step 310, magnetic head detector 110 detects reading of a magnetic stripe from a magnetic instrument 100, as further discussed herein. The magnetic head detector 110 may, in various embodiments, detect a magnetic signal from a magnetic reader head of point-of-sale devices, etc., or detect the magnetic signal generated as the magnetic stripe is read. At step 320, the magnetic head detector 110 transmits a reporting signal to a microchip 120 indicating the magnetic stripe of the magnetic instrument 100 was read. At step 330, the microchip 120 receives the reporting signal from the magnetic head detector 110. At step 340, the microchip 120 transmits a buzzer signal to a microbuzzer 130 to generate an audible noise. At step 350, an audible notification is generated by the microbuzzer 130 when the buzzer signal is received from the microchip 120. In embodiments, microchip 120 may further transmit a notification to a user of the magnetic instrument 100, servicer of the magnetic instrument 100, regulatory authorities, law enforcement authorities, or other parties via phone, text, email, etc., detailing conditions by which the magnetic fields were detected, e.g., a time, location, time between field reads, etc. Moreover, in embodiments, a record may be created for all identified magnetic readers at various locations detailing magnetic reader statistics and information, e.g., card swipe vs. card insert, a number of magnetic field detections, etc., with information deviating from that of the record indicating that a change may have been made to the magnetic reading device at that location. At step 360 (and throughout execution of the presently disclosed embodiments), microbattery 140 is powering the magnetic head detector 110, the microchip 120, and the microbuzzer 130.

Based on the foregoing, a system, method, and computer program product have been disclosed. However, numerous modifications and substitutions can be made without deviating from the scope of the present invention. Therefore, the present invention has been disclosed by way of example and not limitation.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of detecting and reporting skimming of a magnetic stripe of a magnetic instrument having the magnetic stripe, a magnetic head detector, a microchip, and a microbattery, the method comprising:

detecting, by a magnetic head detector embedded in the magnetic instrument powered by the microbattery, a single reading of the magnetic stripe from the magnetic instrument;

transmitting, by the magnetic head detector powered by the microbattery, a reporting signal to a microchip powered by the microbattery embedded in the magnetic instrument indicating the magnetic stripe was read by a magnetic head based on detecting for each single reading of the magnetic stripe;

transmitting, by the microchip powered by the microbattery, a buzzer signal to a microbuzzer embedded in the magnetic instrument based on receiving, by the microchip, the reporting signal for each single reading and sending, by the microchip, a notification to a law enforcement notification via a wireless communication network and to a user of the magnetic instrument when a plurality of reporting signals are received from the magnetic head detector within a predefined timeframe in seconds;

notifying the user of each single reading by generating, by the microbuzzer powered by the microbattery based on the received buzzer signal for each single reading, an audible notification indicating the magnetic instrument was read by the microbuzzer for each single reading when the buzzer signal is received from the microchip; and powering the magnetic head detector, the microchip, and the microbuzzer by a thin-film lithium microbattery embedded in the magnetic instrument, the microbattery recharged by a solar panel embedded in the magnetic instrument.

2. The method of claim 1, wherein the magnetic instrument is a credit card or a debit card.

3. The method of claim 1, wherein the microchip automatically notifies a servicer of the magnetic instrument, regulatory authorities, or other parties detailing conditions by which magnetic fields were detected via phone, text, or email.

4. The method of claim 1, wherein the microchip creates a record for all identified magnetic readers at various locations detailing magnetic reader statistics and information.

5. A method of detecting and reporting skimming of a magnetic stripe of a magnetic instrument having the magnetic stripe, a magnetic head detector, a microchip, and a microbattery, the method comprising:

detecting, by a magnetic head detector embedded in the magnetic instrument powered by the microbattery, a single reading of the magnetic stripe from the from a magnetic instrument;

transmitting, by the magnetic head detector powered by the microbattery, a reporting signal to a microchip powered by the microbattery embedded in the magnetic instrument indicating the magnetic stripe was read by a magnetic head based on detecting for each single reading of the magnetic stripe;

transmitting, by the microchip powered by the microbattery, a buzzer signal to a microbuzzer embedded in the magnetic instrument based on receiving, by the microchip, the reporting signal for each single reading and sending, by the microchip, a notification to a law enforcement notification via a wireless communication network and to a user of the magnetic instrument when a plurality of reporting signals are received from the magnetic head detector within a predefined timeframe in seconds;

generating, by the microbuzzer powered by the microbattery based on the received buzzer signal for each single reading, an audible notification indicating the magnetic instrument was read by the microbuzzer for each single reading when the buzzer signal is received from the microchip; and powering the magnetic head detector, the microchip, and the microbuzzer by a thin-film lithium microbattery embedded in the magnetic instrument, the microbattery recharged by a solar panel embedded in the magnetic instrument.

6. The method of claim 5, wherein the magnetic instrument is a credit card or a debit card.

7. The method of claim 5, wherein the microchip automatically notifies a servicer of the magnetic instrument, regulatory authorities, or other parties detailing conditions by which magnetic fields were detected via phone, text, or email.

8. The method of claim 5, wherein the microchip creates a record for all identified magnetic readers at various locations detailing magnetic reader statistics and information.

* * * * *